United States Patent [19]
Garuglieri et al.

[11] Patent Number: 5,383,382
[45] Date of Patent: Jan. 24, 1995

[54] SAW TABLE WITH RELEASABLE LOCKING DEVICE

[75] Inventors: Andrea Garuglieri, Colle Brianza; Giovanni A. Folci, Briosco, both of Italy

[73] Assignee: Black & Decker Inc., Newark, Del.

[21] Appl. No.: 111,692

[22] Filed: Aug. 25, 1993

[30] Foreign Application Priority Data

Aug. 28, 1992 [GB] United Kingdom ............... 9218299

[51] Int. Cl.⁶ ............................................. B23D 45/14
[52] U.S. Cl. ................................. 83/471.3; 83/581; 83/698.11
[58] Field of Search .............. 83/471.3, 472, 473, 83/477, 581, 698.11, 490, 477.1; 403/337, 338, 367; 411/354, 361, 265, 522, 523, 524, 935, 935.1

[56] References Cited

U.S. PATENT DOCUMENTS

| | | | |
|---|---|---|---|
| 530,766 | 12/1894 | Gaston | 411/354 |
| 948,357 | 2/1910 | Tomlinson | 411/265 |
| 1,452,777 | 4/1923 | Band | 411/354 |
| 1,487,184 | 3/1924 | Saunier | 411/354 |
| 1,694,326 | 12/1928 | Klausner | 411/354 X |
| 2,513,873 | 7/1950 | Horton | 83/471.3 |
| 2,973,020 | 2/1961 | Bennett | 83/471.3 |
| 3,821,918 | 7/1974 | Niehaus et al. | 83/471.3 |
| 3,998,121 | 12/1976 | Bennett | 83/471.3 |

*Primary Examiner*—Rinaldi I. Rada
*Assistant Examiner*—Clark F. Dexter
*Attorney, Agent, or Firm*—Charles E. Yocum; Dennis A. Dearing; John D. Del Ponti

[57] ABSTRACT

A releasable locking device for acting between a first member 5 and a second member 3, the two members 3,5 being held against relative motion when the device is in its locking position (FIG. 1) and being free to move relative to each other when the device is in its release position (FIG. 2), the locking device comprising a flanged pin 7 for passing through the first member 5 and engaging a second member 3 and releasable means 17 for acting between the flange 15 of the pin 7 and the first member 5 to drive the first member 5 towards the second member 3 until relative motion between the first and second members 3,5 is prevented. The locking device is particularly suitable for locking a round table 5 and a fixed table 3 of a circular saw base table 1 together when a saw cut is to be made.

9 Claims, 3 Drawing Sheets

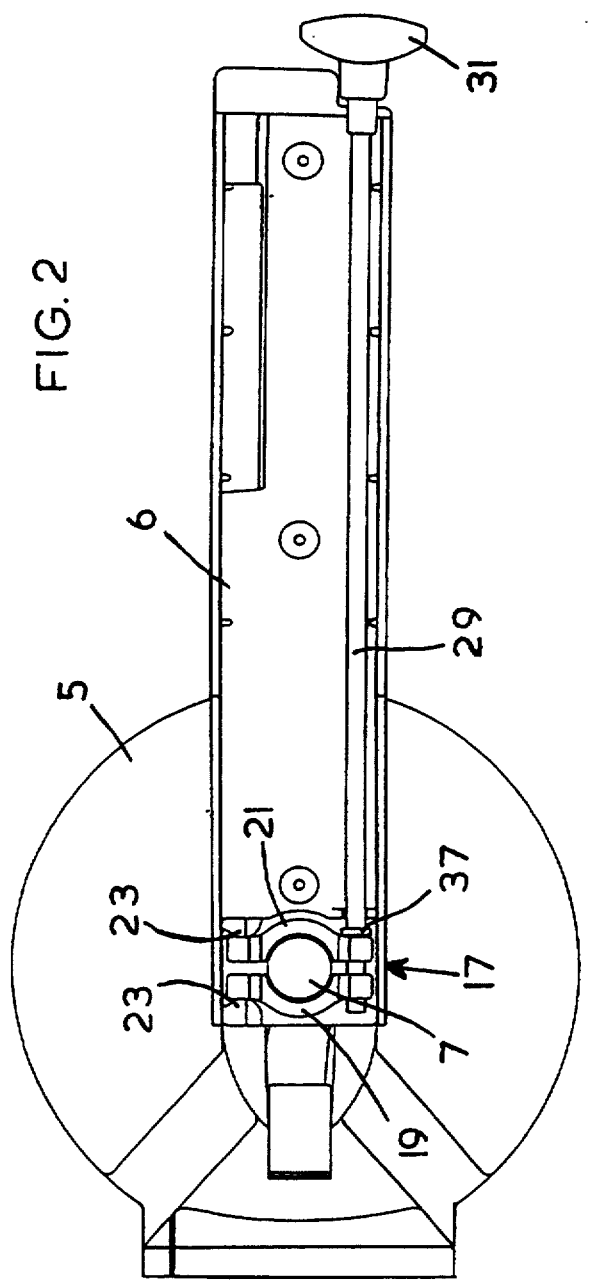
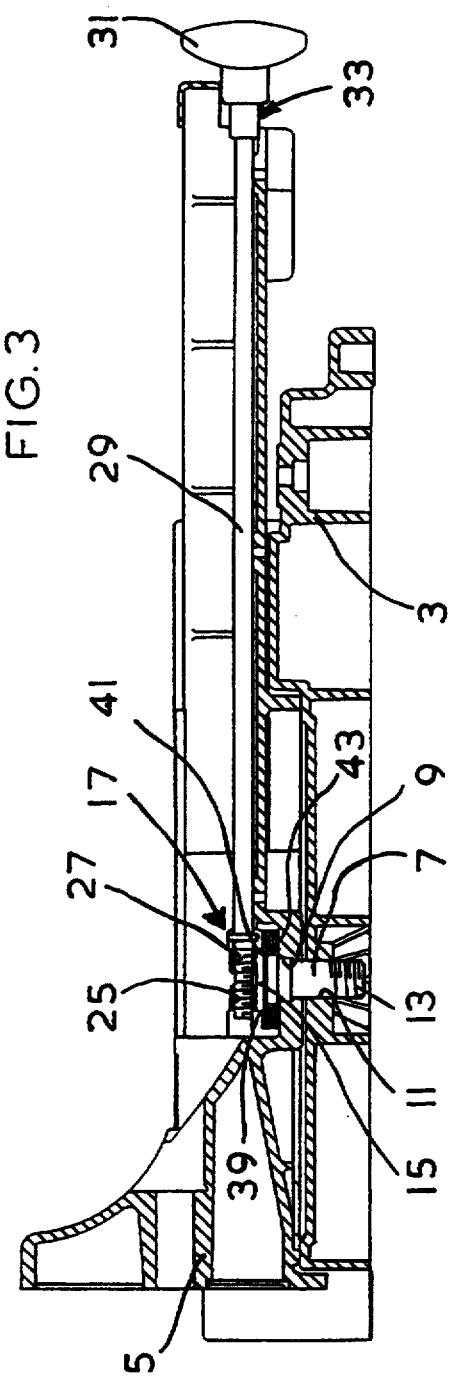

SAW TABLE WITH RELEASABLE LOCKING DEVICE

BACKGROUND OF THE INVENTION

This invention relates to releasable locking devices, and in particular to a locking device for acting between a movable table and a fixed table of a circular saw.

Circular saws, in which a saw blade, driven by a motor, is hingedly connected to a base table for cutting workpieces situated on the base table, are well known. It is also known for a base table to include a round saw table rotatably received in the middle of a fixed table. The round table sometimes has an extension arm received in a segmental recess of the fixed table.

The round table and extension arm (if included) have a slot into which the blade of the circular saw plunges after cutting a workpiece received against a guide fence fixed to the base table. Plunging of the blade is achieved by pivoting of the blade housing. Mitre cuts can be made with such prior art saws by first rotating the round table, and hence the saw blade, with respect to the fixed table and fence.

Although a prior art circular saw as described above works well, the freedom of the pivot necessary to allow the round table to rotate to different positions can be a potential source of positional error during the cutting of a workpiece. This is particularly relevant when considering mitre angles, wherein a few degrees of error can make a substantial difference to the end result.

SUMMARY OF THE INVENTION

The present invention aims to improve upon circular saw tables of the aforementioned type, primarily by providing a releasable locking device which can reliably lock a round table in a desired position relative to a fixed table.

According to the present invention, there is provided a releasable locking device for acting between a first member and a second member, the two members being held against relative motion when the device is in a locking position and being free to move relative to each other when the device is in a release position, the locking device comprising a ranged pin for passing through the first member and engaging the second member and releasable means for acting between the flange of the pin and the first member to drive the first member towards the second member until relative motion between the first and second members is prevented.

The releasable means may grip the pin to prevent relative rotation therebetween when the locking device is in its locking position. In this way, the freedom of play between the various components can be reduced further.

Preferably the releasable means for acting between the flange and the first member comprises a pinch clamp. In one embodiment of the invention, the pinch clamp comprises two substantially semi-circular jaws and a threaded rod for driving the jaws together or apart.

The jaws preferably have chambered edges for driving the flange of the pin and the first member apart during locking. It is also preferable that the flange itself has a conical portion for bearing against the chamfered edges of the jaws.

Preferably the pin is a bolt having a threaded end for receiving a lock nut to hold the pin in engagement with the second member. Of course, any other suitable pin, or combination of axle and end stop, could equally well be used.

The pin is preferably shaped to be received in close tolerance bores in the first and second members to reduce play therebetween.

The releasable means may include a manual activation knob or handle spaced from the first and second members to facilitate activation of the locking device.

In a preferred embodiment of the present invention, the first member is a round table and the second member is a fixed table of a circular saw base table, the round table being designed to be moved relative to the fixed table prior to being held in position when a saw cut is to be made.

BRIEF DESCRIPTION OF THE DRAWINGS

A specific embodiment of the present invention is now described, by way of example only, with reference to the accompanying drawings, in which:

FIG. 2 is a plan view of the round table and the extension arm shown in FIG. 1;

FIG. 3 is a sectioned side view of the base table shown in FIG. 1; and

DETAILED DESCRIPTION OF A PREFERRED EMBODIMENT

Figure 1:
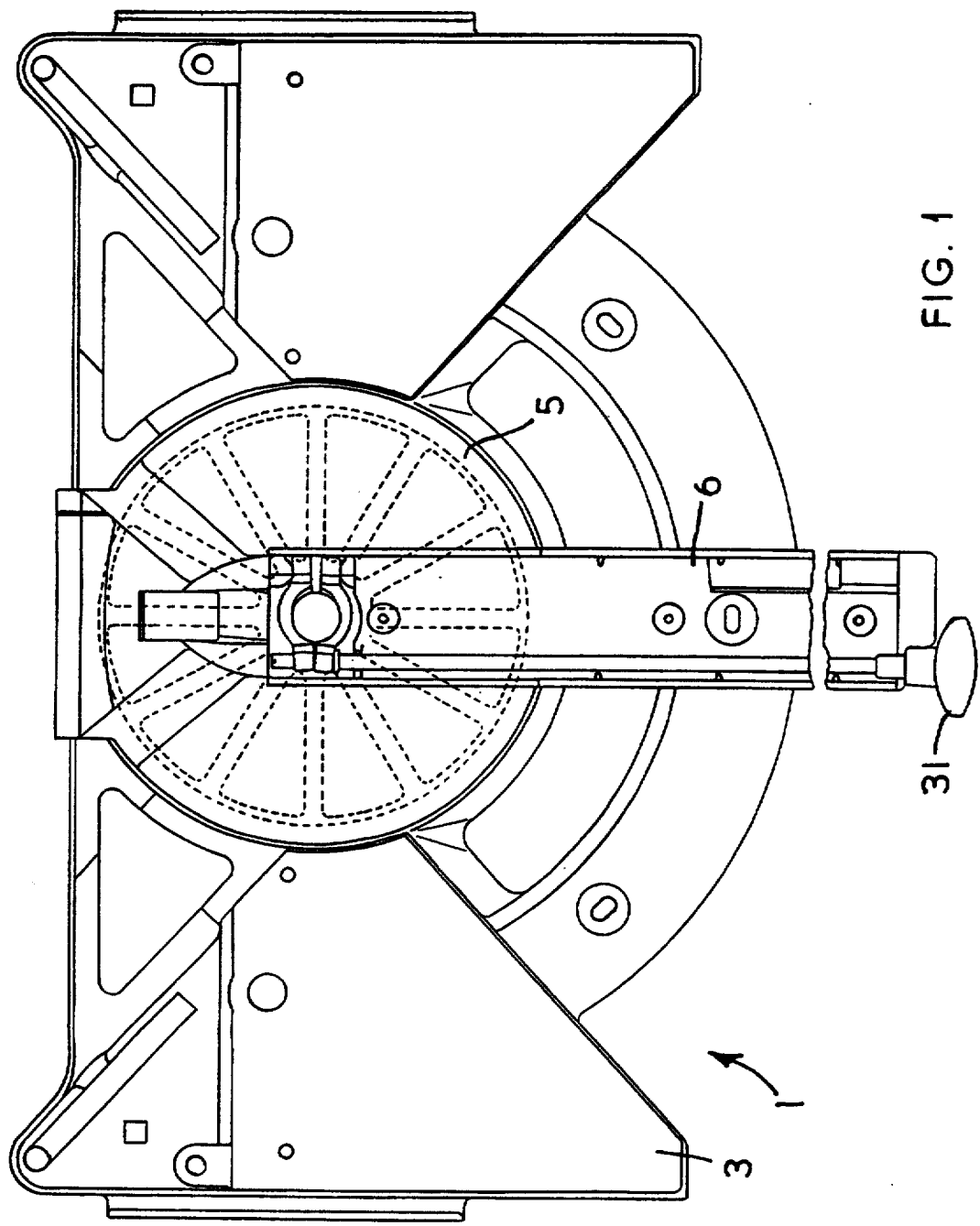
FIG. 1 is a plan view of a circular saw base table according to the present invention.
Figure 4:
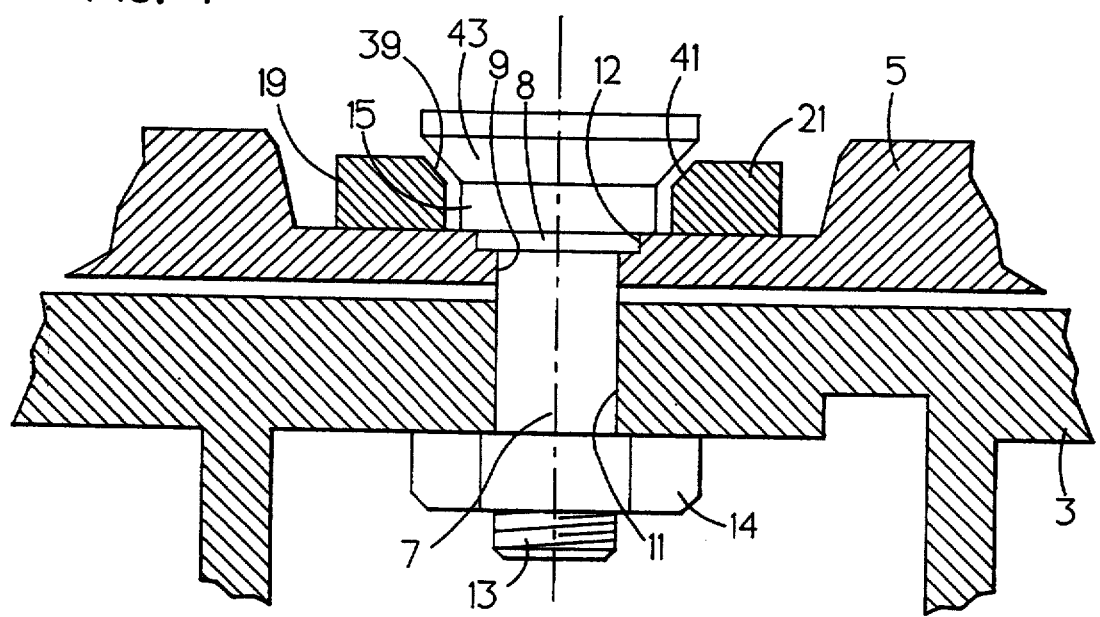
FIG. 4 is a magnified view of the pinch clamp and bolt as shown in FIG. 3.

In the drawings, a circular saw base table 1 comprises a fixed table 3 and a round table 5. The round table 5, which incorporates an extension arm 6, is loosely received in the fixed table 3; As shown most clearly in FIGS. 3 and 4, the round table 5 is, however, positioned with some radial accuracy with respect to the fixed table 3 by means of a shaft or bolt 7 passing through close tolerance bores 9,11 in the round and fixed tables respectively. The bolt 7 has a lock nut 14 on its threaded end 13, so that the bolt 7 is held in contact with the fixed table 3. At the other end of the bolt 7, above the round table 5, a chamfered flange 15 is provided. In the preferred embodiment as shown in FIGS. 3 and 4, bolt or pin 7 has an enlarged shaft portion 8 which engages in counter-bore 12 of bore 11.

A pinch clamp 17 is arranged between the flange 15 and the round table 5. The pinch clamp 17 comprises two substantially semi-circular jaws 19,21. One end of both jaws 19,21 is received in a trap 23 formed in the round table 5. The other end of the jaw 19 has a threaded bore 25, while the other jaw 21 has a corresponding bore 27 which is larger and unthreaded.

A long bolt 29, carrying a tomb 31 to facilitate activation of the locking device, passes through an aperture 33 in the end of the extension arm 6 and through the bore 27 and is screwed into the bore 25. A collar 37, fixed to the bolt 29, abuts against the face of the clamp jaw 21.

The clamp jaws 19,21 have chamfered edges 39, 41 which co-operate with a conical portion 43 of the flange 15 on the bolt 7. When the long bolt 29 is turned via the knob 31, the chamfered edges 39,41 bear against the conical portion 43 of the flange 15 to urge the flange 15 and the round table 5 apart. Since the bolt 7 is fixed to the fixed table 3, the center portion of the round table 5 is forced downwardly towards the fixed table 3 until engagement between the two tables 3,5 is so tight that relative movement therebetween does not occur. More particularly, the jaws 19,21 of the pinch clamp 17 move towards each other if the round table 5 is to be locked in position, or away from each other if the round table 5 is to be released.

When the jaws 19,21 of the pinch clamp 17 are tightened sufficiently, the jaws 19,21 may be arranged to grip the bolt 7, thereby providing even greater rigidity to the circular saw table 1 during cutting of a workpiece mounted on the table 1. Furthermore, due to the interaction between the conical portion 43 of the flange 15 and the chamfered edges 39,41 of the clamp jaws 19,21, the relative positions of the bolt 7 and the pinch clamp 17, when in the locked position, are always substantially the same.

As will be appreciated from the foregoing, if a mitre cut is to be made, the knob 31 is rotated to separate the jaws 19,21 of the pinch clamp 17, thereby allowing the flange 15 to approach the round table 5 and hence enable the round table 5 to move relative to the fixed table 3 about the bolt 7. The desired angle of cut is determined by pivoting the round table 5, with conical surface 43 and clamp surfaces 39, 41 being out of engagement, prior to the knob 31 being turned in the opposite direction to lock the round table 5 in the desired position relative to the fixed table 1. Thus, when the circular saw is used to cut a workpiece positioned on the table 1, the amount of undesired play, or freedom of movement, between the fixed table and the saw blade is substantially reduced. Reliably accurate saw cuts can therefore be made, thereby improving the quality of workmanship arising from use of the circular saw.

It will of course be understood that the present invention has been described above purely by way of example, and that modifications of detail can be made within the scope of the invention.

We claim:

1. A saw table assembly for making highly accurate saw cuts at selected angles comprising in combination:
   (a) a fixed table,
   (b) a pivotable saw table having a central bore, said pivotable saw table being pivotably movable about said control bore over a portion of said fixed table,
   (c) a vertically extending bolt having a vertical pivot axis, a lower end and an upper end, said lower end being fixed to said fixed table and said bolt extending upwardly through said bore in said pivotable saw table,
   (d) said bolt having an enlarged flange at its upper end, said enlarged flange being positioned above said pivotable saw table and said flange having a conical surface portion, and
   (e) clamp means for clamping said pivotable saw table in selected pivoted positions relative to said fixed table, said clamping means; secured to said pivotable saw table, said clamp means having a clamping position and a non-clamping position, said clamp means being positioned such as to engage said conical surface portion of said bolt when said clamp means are in clamping position such that said conical surface and said clamp means clamp said pivotable saw table with high accuracy in one of said selected positions.

2. The saw table assembly of claim 1 wherein said clamp means are positioned on said pivotable table at a position below said conical surface portion, and said clamp means force said pivotable table downwardly against said fixed table when said clamp means are in clamping position against said conical surface portion.

3. The saw table assembly of claim 1 wherein said clamp means comprise a pair of arcuate clamping members at least partially surrounding said bolt, each of said arcuate clamping members having a chamfered surface positioned adjacent a portion of said conical surface portion and positioned such as to engage said conical surface portion when said clamp means are in clamping position.

4. The saw table assembly of claim 3 further including operating means for moving said clamping members to and from said clamping position and for operating said clamping members from a location remote from said clamping means, said operating means comprising an elongated rod having a handle at one end and threaded means at the opposite end of said rod, and at least one of said clamping members having a threaded portion receiving said threaded means of said rod.

5. The saw table assembly of claim 1 wherein said enlarged flange includes a portion below said conical surface portion, said portion below said conical portion being of a size and shape relative to said clamping means such as to be engaged by and clamped by said clamp means when said clamp means are in clamping position.

6. A saw table assembly for making highly accurate angled saw cuts over a prolonged period of time comprising in combination:
   (a) means forming a fixed table,
   (b) means forming a pivotable table, said pivotable table having a central portion extending parallel to and spaced from said fixed table,
   (c) pivot means connected to said fixed table and extending through said central portion of said pivotable table and forming a pivot axis about which said pivotable table pivots to set the angle of the saw cut,
   (d) said pivot means including a conical surface portion, said conical surface portion extending concentrically about said pivot axis, and
   (e) clamping means for clamping said pivotable saw table in selected pivoted positions relative to said fixed table, said clamping means; positioned such as to engage said conical surface portion when said clamping means engage said conical surface portion, said conical surface portion and said clamping means being positioned such as to force said pivotable and fixed tables into frictional engagement with each other to secure said pivotable table at a selected angle for a saw cut.

7. The saw table assembly of claim 6 wherein said clamping means include a pair of clamp members having arcuate clamping surfaces, said clamp members being movable into a clamping position in which said arcuate clamping surfaces engage said conical surface portion.

8. The saw table assembly of claim 6 wherein said clamping means are secured to said pivotable table and are positioned between said central portion of said pivotable table and said conical surface portion such that engagement of said clamping means with said conical surface portion forces said central portion of said pivotable table into frictional engagement with said fixed table.

9. The saw table assembly of claim 6 including remote operating means for clamping and unclamping said clamping means relative to said conical surface portion, said remote operating means including an elongated rod, said elongated rod being operatively connected at one end to said clamping means to clamp and unclamp said clamping means relative to said conical surface portion, and said elongated rod having handle means at the other end of said rod for manually moving said rod such as to clamp and unclamp said clamping means relative to said conical surface portion.

* * * * *